April 5, 1932.   J. E. COLAS   1,852,919
SELF LOCKING NUT, WASHER, AND THE LIKE
Original Filed Jan. 30, 1929   2 Sheets-Sheet 1
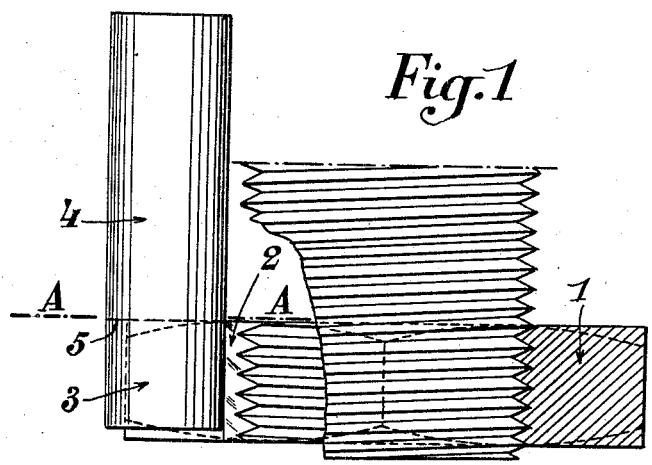
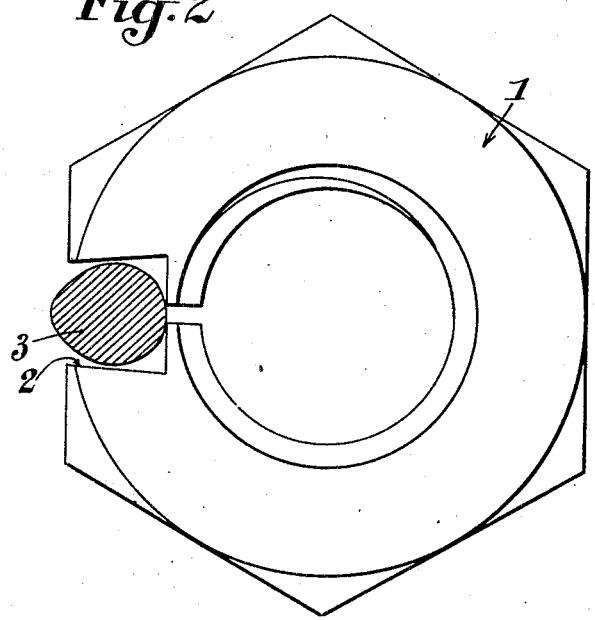

April 5, 1932.  J. E. COLAS  1,852,919

SELF LOCKING NUT, WASHER, AND THE LIKE

Original Filed Jan. 30, 1929   2 Sheets-Sheet 2

J. E. Colas
INVENTOR
By: Marks & Clerk
ATTYS.

Patented Apr. 5, 1932

1,852,919

UNITED STATES PATENT OFFICE

JOSEPH ERNEST COLAS, OF PARIS, FRANCE

SELF LOCKING NUT, WASHER, AND THE LIKE

Original application filed January 30, 1929, Serial No. 336,197, and in France February 14, 1928. Divided and this application filed August 17, 1931. Serial No. 557,707.

My invention relates to improvements in self-locking nuts, washers, and the like of the split-type i. e. in which the piece of work made of resilient material is provided with a substantially radial slot so that it can be expanded at will by the insertion into said slot of a suitable tool, put in place into the bolt, and then allowed to collapse by the removal of said tool. This application is a division of my copending application, Serial Number 336,197, filed January 30, 1929.

The object of my invention is essentially to devise a split ring nut lock, nut, or washer of the aforesaid type which can be easily expanded in practice. Great difficulties have been experienced in devising convenient means for expanding such a ring so as to increase its diameter to allow it to be engaged upon or disengaged from the bolt; these difficulties are due for a part to the fact that the efficiency of the device depends on the pressure exerted by the resilient ring upon the bolt; as the pressure is proportional to the square root of the work performed in expanding the ring, it is eminently desirable to exert as great a power as possible to expand the ring to the required diameter so as to provide for a gripping engagement of the ring upon the bolt when the expanding member is released, and this must be accomplished by means of a quite cumberless device not increasing the bulk of the ring or nut and further adapted to be operated and removed in any case appearing in practice, whatever may be the position of the locking ring.

A convenient tool already proposed for this purpose is a rod having an oval shaped part adapted to be inserted into the slot so that when it is turned therein it spreads apart both lips of said slot. But such a tool is liable to very easily jump out of the slot while being turned and further does not securely hold the nut expanded while the latter is being screwed home, and in fact such a tool can not be used in practice.

My invention aims to remove this drawback and to enable the practical use of the aforesaid expanding tool.

In the accompanying drawings which are given solely by way of example:

Fig. 1 is an elevational view of a nut according to the invention provided with its expanding device, shown in the clamping position.

Fig. 2 is an horizontal section on the line A—A of Figure 1.

Figure 3:
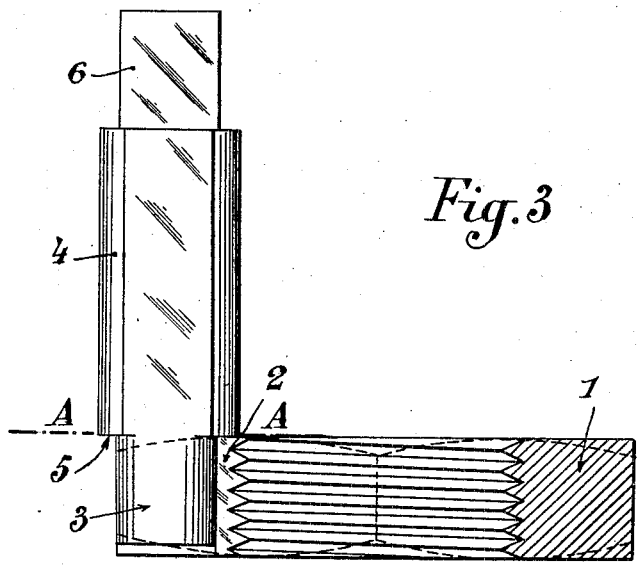
Figure 4:
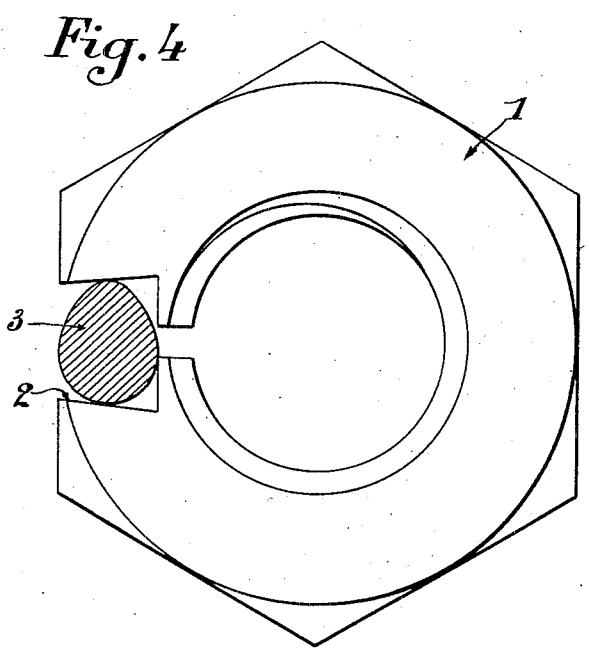

Figs. 3 and 4 correspond respectively to Figures 1 and 2, but with the nut in the released position.

In the form of construction herein represented, the nut 1, which may have any suitable form, either round, hexagonal or other, and may also have any suitable thickness, since the said nut may be used as an ordinary nut or as a lock nut, is provided with a radial slot 2. The said slot has a local increase in section for the insertion therein of the expanding tool and narrows both inwardly and outwardly in order to hold in place said tool and to prevent it from escaping. The said nut consists of a metal or any suitable resilient material.

Into the said slot 2 may be inserted the end 3 of a rod or key 4, which end has an oval shape and thus forms a cam. The long axis of the cam section somewhat exceeds the width of the slot. The cam 3 is connected to the main body of the rod 4 by a shoulder 5. At the other end of the said rod is a square part 6 upon which may be engaged a suitable wrench or the like.

The operation is as follows:

To release the nut 1, the said cam 3 of the rod 4 is inserted into the slot 2, as shown in Figures 1 and 2. The shoulder 5 bears upon the upper face of the nut. It will then suffice to engage a small wrench upon the square part 6 and to exercise an effort upon the said wrench by turning it for instance in the clockwise direction in order to widen the slot by means of the cam 3, as shown in Figures 3 and 4. The nut 1, whose diameter is thus increased, may then be turned readily upon its corresponding bolt or the like.

Owing to the peculiar shape given to the slot the tool is effectively prevented from jumping outwardly while being turned and can be devised to exert a very powerful expanding action.

The blocking operation is effected in an analogous manner. In the case of a threaded nut, this latter is screwed into place in the usual manner, with the cam engaged in its slot so that the nut will be loose on the threaded rod during this operation. When the nut has been thus placed in position, it is held against rotation by the wrench which was used to screw it, and the small wrench is engaged upon the square end 6 of the said rod. This wrench is turned through 90 degrees, in the opposite direction to the preceding, so as to bring the large axis of the cam in the direction of the axis of the bolt. During this latter operation, the nut will gradually come together, and will press tightly upon its rod.

It will be observed that the expanding device occupies no additional space, and that it may be used in all cases in which a nut is to be screwed upon a threaded rod whether the nut is embedded or is in the immediate vicinity of a wall which only offers passage to a wrench. The cam which is placed in position permits the loosening of the nut without requiring any increase of the free space necessary for the passage of the nut alone when it is unscrewed.

The said self locking nut is of a very simple construction, and can be readily trimmed; it is inexpensive, strong and substantial, and can thus be manufactured with great facility.

The same method can be employed to secure a smooth washer upon a smooth rod.

Obviously, the said invention is not limited to the form of construction herein described and represented, which is given solely by way of example.

In this manner, the said cam may be terminated by an enlarged part having a set of holes for the insertion of a spindle of any kind.

Having now described my invention what I claim as new and desire to secure by Letters Patent is:

A self locking resilient radially split nut adapted to be expanded by turning within the split a substantially oval shaped expanding member which is adapted to be introduced into the split longitudinally of the nut, wherein the substantially radial split is given such a shape as to form inside the very wall of the nut a housing narrowed at both its outward and inward ends.

In testimony whereof I have signed my name to this specification.

JOSEPH ERNEST COLAS.